United States Patent Office 2,824,814
Patented Feb. 25, 1958

2,824,814

FLUORESCENT COATING PROCESS

Shannon Jones, East Cleveland, and Mary V. Hoffman, South Euclid, Ohio, assignors to General Electric Company, a corporation of New York No Drawing. Application May 24, 1954
Serial No. 432,042

2 Claims. (Cl. 117—33.5)

This invention relates to the coating of a surface of hollow glass or other vitreous bodies with a luminescent material, and more particularly to a method employing viscous aqueous media in applying such a coating to an electric discharge device envelope.

In processes generally employed in practice, a powdered luminescent material is suspended in a binder comprising a solution in a suitable solvent of nitrocellulose or other material possessing suitable similar properties. The suspension is introduced into the interior of the tube to be coated, allowed to drain and dried either by passing a current of warm air through the tube or by natural convection. Finally, the tube is heated in an oxidizing atmosphere at a temperature sufficient to remove the binder material.

Many precautions have to be taken with regard to the inflammability, purity and toxicity of the binder and its solvent evaporation rate to produce satisfactory coatings. It can be readily appreciated that these necessary precautions and the relatively high cost of the ingredients render this type binder least desirable.

In an effort to overcome these problems, aqueous solutions of water-soluble cellulose derivatives have been suggested. In general these solutions have proved to be workable; however, other problems have arisen in connection with their use. Many of the water-soluble cellulose derivatives tend to produce a grainy coating of luminescent material or one containing bubbles or pinholes. Results obtained with those binders have also shown a loss of efficiency in the finished lamp, as much as eight lumens per watt, and reduced maintenance (loss of light during life) as compared to lamps coated with luminescent powders suspended in a binder solution of nitrocellulose. In addition, most of the water-soluble cellulose derivatives will not give a solution of desired viscosity without increasing the solids content. Too great an increase in the amount of solids in the binder solution leads to considerable difficulty when the dried coating is heated to remove the binder in that, even at elevated temperatures for prolonged periods, the organic binder material is not completely removed. This failure to remove the binder ultimately causes discoloration, such as brown rings in the luminescent coating. This heating operation to remove organic material from the dried coating will hereinafter be referred to as lehring.

It is therefore an object of this invention to provide a water-soluble binder which will produce a smooth even coating of luminescent powders on the surface of glass or other vitreous bodies.

It is a further object of this invention to provide a water-soluble binder which has no deleterious effect on the performance characteristics of electric discharge devices and, in fact, improves said characteristics.

Still another object is to provide a water-soluble binder capable of producing a sufficiently viscous solution at low solids content for easy and complete removal of the binder material from the dried coating.

Briefly stated, according to one aspect of the invention this binder or vehicle is composed of a water solution of carboxymethyl cellulose which gives the desired viscosity in solution without excess solids and, when burned, leaves only a small or no residual ash.

Carboxymethyl cellulose is commercially available in powder form as the sodium salt which is readily soluble in water. In order to use this material as a binder for luminescent powders, it is necessary to remove the sodium by de-ionizing a water solution of the sodium salt to obtain the "free acid" form which has H+ ions substituted for Na+. This may be readily accomplished by flowing the water solution of the sodium salt up through a resin tower containing a cation exchange resin, for example one of the nuclear sulfonic cation exchange type. The original sodium solution has a viscosity of approximately 80 seconds through a #7 Parlin cup at 25° C. and contains approximately 0.5% solids, i. e., 0.5 gram of sodium carboxymethyl cellulose in 100 cubic centimeters of water. The de-ionizing process destroys some of the viscosity of the binder and changes the solids-viscosity ratio but the viscosity of the de-ionized "free acid" form remains well within the desired 40 to 70 second range indicated below. This reduction in viscosity results in a change in the solid viscosity ratio but the solids content of the solution remains substantially unchanged. If the original sodium solution is run through the resin tower hot or the resin bed is maintained at an elevated temperature, the solution will flow through the resins more readily. Improved results can be obtained with resin bed temperatures as low as 40° C.

The addition of ammonium hydroxide will increase the viscosity of the de-ionized "free acid" type carboxymethyl cellulose about 8 to 10 seconds and also improve the stability and clarity of the solution. The ammonium hydroxide is added in the amounts of about 6 milliliters per liter of de-ionized solution or about three times the stoichiometric requirement. The ammonium carboxymethyl cellulose solution thus produced has a viscosity within the desired range (40 to 70 seconds through a #7 Parlin cup at 25° C.) and a solids content of about 0.35 to 0.60 percent for easy lehring. The sodium content has been reduced to about three parts per million based on total binder weight.

The addition of amines and hydroxyamines to aqueous solutions of carboxymethyl cellulosic acid will form, up to the limits of solubility, amine or hydroxyamine carboxymethyl cellulose solutions. These salts of carboxymethyl cellulose, being similar in properties to the ammoniated form, also provide binder solutions of sufficiently high viscosity and low solids content to be suitable for the suspension of luminescent powders.

By way of specific example, a coating suspension of luminescent powder may be prepared as follows:

About 0.4 part by weight of sodium carboxymethyl cellulose (Type 70 High, Hercules) are dissolved in 100 parts of pure hot (about 70° C.) water with strong agitation by a colloid mill for about 30 minutes. This sodium solution is then filtered while hot through cloth to remove small particles of solid material which have not yet gone into solution. The solution is then forced up through a column containing a demineralizing resin such as previously mentioned. The temperature of the solution is preferably maintained at 50–60° C. while passing upward through the column to permit more rapid output of the de-ionized solution. The rate of output, dimensions of the column, regeneration of the exchange resin and other variables and procedures are controlled by the general principles of cation exchange familiar to those skilled in that art and very similar to the principles employed in de-ionization (demineralization) of water.

The liquid which emerges from the resin column is an aqueous colloidal solution of the free acid form of carboxymethyl cellulose. About 5 milliliters of aqua ammonia (28% $NH_3$) are then added to each liter of the acid carboxymethyl cellulose solution, containing about 0.4% solids, which produces the ammonium carboxymethyl cellulose solution with excess ammonia used as the binder or suspending vehicle for luminescent powders.

It will be noted that sodium can be removed by a batch process without the use of a resin column. In the batch process 1250 grams of sodium carboxymethyl cellulose are dissolved in 50 gallons of pure water and stirred or passed through a colloid mill or homogenizer. Approximately 3 gallons (wet measure) of Amberlite IR-120 or similar nuclear sulfonic cation exchange resin (regenerated with hydrochloric acid solution) are added to the solution with slow agitation for about two hours to simulate the action obtained in a resin column and allow the resins to remove the sodium. After allowing the resins to settle, the binder solution is passed through a filter pump into a clean glass-lined tank. Treatment with ammonia, as before, gives the desired ammonium carboxymethyl cellulose solution.

The de-ionization process is very effective in removing sodium from the binder solution. Tests of the solution indicate from 2 to 5 parts per million sodium remaining in the solution which is well below the tolerable maximum amount of about 50 parts per million (stoichiometric) as sodium. Sodium in excess of this stoichiometric maximum may have a detrimental effect on efficiency and maintenance of fluorescent lamps and other electric discharge devices in which the binder solution is used.

A suspension is then prepared by mixing the luminescent powder in the binder vehicle. This may be done in a one gallon ball or pebble mill using a ratio of 1 milliliter of binder solution to 1 gram of phosphor and milling for about 10 hours. The ratio of binder solution to phosphor in the coating suspension may be varied. Ratios (milliliters to grams) of about 1 to 1, 1.5 to 1, and 2 to 1 produced good results.

Preservatives are helpful in preventing mold growth in the binder solution and in the mixed phosphor and binder suspension. The "free acid" form of carboxymethyl cellulose supports rapid mold growth. However, it has been found that the excess ammonia in ammonium carboxymethyl cellulose, the preferred binder form, is as effective as other preservatives in controlling bacterial action. Fungicides such as methyl p-hydrobenzoate and propyl p-hydrobenzoate in amounts of about 15 to 18 milligrams per liter of solution are of some additional value in retarding mold growth in ammonium carboxymethyl cellulose solution containing excess ammonia. The best procedure to minimize mold damage is to prepare the solution with minimum exposure to air in a closed system using low pressure mercury ultraviolet, or germicidal, lamps over the binder and suspension during stirring. The suspension should be stored in an airtight container kept full to reduce the air-liquid interface, maintaining the excess ammonia at all times as previously mentioned to minimize attacks by microorganisms, thereby improving suspension stability.

Many variations in milling procedure are possible, most producing good results. For example, the phosphor may be milled in water for several hours and the binder then added and milling continued for a suitable period. It will be noted that the phosphor powder may be washed with water or dilute acids (provided the acids are subsequently washed out) prior to milling or mixing with the water-soluble binder which improves the performance characteristics of the finished lamps. Washing was not previously feasible since an expensive and time-consuming drying operation was necessary before the washed phosphor could be added to other type binders such as nitrocellulose or ethyl cellulose in butyl acetate or similar solvents. The wet phosphor can be added directly to the ammonium carboxymethyl cellulose binder solution of our invention without drying since the binder is in a water solution and additional moisture will not affect it. An effective procedure appears to be that of milling a slurry of 1000 grams of phosphor in 325 ml. of water and 5 ml. of ammonium poly-acrylate containing excess ammonia (or other similar dispersing agents) for about 4 hours. The binder solution is then added at the end of the milling period.

Wetting and dispersing agents may be added as milling aids or, after milling, to the suspension with beneficial results. For example, the following additives have improved the coating appearance and the dispersion and flow characteristics of the suspension: 5 ml. of ammonium poly-acrylate with an excess of ammonium hydroxide as a milling aid in a 1 gallon mill charge; octyl alcohol; ammonium acrylate (0.25%) used with octyl alcohol; water-soluble silicones such as sodium methyl siliconate in amounts of about 0.025% by volume added before milling; sodium phosphate and silicate mixtures; glycols and higher alcohols. These additives appear to lehr out of bulb coatings satisfactorily and finished lamps show good efficiency and maintenance. It will be noted that when ammonium acrylate is used the hydrogen ion concentration of the binder solution should be above pH8; otherwise the acrylate will attack the binder, destroying it.

The interior surface of tubes for use in making fluorescent lamps may be coated with the suspension by any of several well-known methods. The coating may be effected by raising the suspension into the tube, held vertically, by air pressure and then allowing the tube to drain or by flushing the suspension down the inside of the vertically held tube and allowing it to drain. The former is known as the up-flush method while the latter is commonly known as down-flushing.

The coating must be dried immediately after its application. Since this type binder is in a water solution as opposed to the highly volatile solutions previously employed, it is somewhat more difficult to dry. The preferred method involves forcing heated air down through the interior of the bulb. Drying temperatures near 110–115° C. have proven satisfactory. The drying time at 115° C. is between 12 and 15 minutes. Bulbs have been dried at temperatures as high as 175° C. in 5 minutes with no damage to the binder or coating appearance.

The tube bearing the dried coating is then lehred to remove solid binder residue. This may be accomplished by heating the tube to a temperature of 500–600° C. over a period of 2 to 5 minutes while passing a slow stream of air through the tube to remove the residuum of the vehicle. The lehring process has been successfully conducted on both gas and electric lehrs. The upper limit of temperature is determined by the necessity for avoiding softening of the glass.

Test results on lamps prepared with ammonium carboxymethyl cellulose have shown considerable improvement in initial lumen output, maintenance and efficiency over those using conventional nitrocellulose binders and also those made with other water-soluble cellulose derivatives. The gain in output is better than 100 lumens after 100 hours of operation, and performance figures after 500 hours of operation show an increase of over 3% compared to other lamps.

The process according to the invention has been found suitable when the luminescent material is a silicate, tungstate, phosphate, halophosphate or borate or mixtures thereof. There is no reason to believe that it is not suitable for use with any known material, the luminescent properties of which are not impaired by water. However, in some cases certain precautions may need to be exercised with regard to the storage stability of the suspensions. Apparently a slow reaction occurs between the luminescent powders and the ammonium carboxymethyl cellulose solution in which it is suspended which reduces the shelf life of the suspension. This reaction may be particularly troublesome in tungstate and borate phosphors causing gelling of the suspensions and appears to destroy the cellulose derivative as well as the flow characteristics of the suspension. However, continuous stirring of the suspension, washing the tungstate and borate powders with dilute acetic acid, the additives and especially the amount of ammonium hydroxide present, as previously mentioned, improve the stability of the suspension. Treated as suggested, borate and tungstate suspensions can presently be stored for about 2 days with very little, if any, deterioration. Phosphors other than tungstates and borates have been stored for considerably longer periods (up to 10 months) and still produced good coatings.

Although a preferred embodiment of our invention has been described with particularity, it is recognized that variations and changes may be made therein within the spirit and scope of the invention as defined by the appended claims. It is understood particularly that the ingredients, their proportions and also the times and temperatures can be varied, independently and in relation to each other, within fairly wide limits to obtain the desired results.

What we claim as new and desire to secure by Letters Patent of the United States is:

1. The process of coating a vitreous surface with powdered luminescent material which includes the steps of flowing over said surface a suspension of said luminescent material in a water binder solution of a water-soluble cellulose derivative comprising essentially ammonium carboxymethyl cellulose, draining the excess suspension from said surface and drying the resultant coating, and thereafter heating the coating so formed to a temperature at which said water-soluble cellulose derivative is essentially expelled.

2. The process of coating a vitreous surface with powdered luminescent material which includes the steps of flowing over said surface a suspension of said luminescent material in a water binder solution of a water-soluble cellulose derivative carboxymethyl cellulose to which has been added about three times the stoichiometric requirement of ammonium hydroxide, draining the excess suspension from said surface and drying the resultant coating, and thereafter heating the coating so formed to a temperature at which said water-soluble cellulose derivative is essentially expelled.

References Cited in the file of this patent

UNITED STATES PATENTS

| | | |
|---|---|---|
| 2,621,134 | Welch | Dec. 9, 1952 |
| 2,676,894 | Anderson et al. | Apr. 27, 1954 |
| 2,744,072 | Meister | May 1, 1956 |